Nov. 14, 1961   J. R. STEIGERWALD   3,009,142
INDICATOR MEANS FOR BRAKES
Filed Sept. 8, 1959

*INVENTOR.*
JOHN R. STEIGERWALD
BY
*J. B. Holden*
ATTORNEY

United States Patent Office 3,009,142
Patented Nov. 14, 1961

3,009,142
INDICATOR MEANS FOR BRAKES
John R. Steigerwald, Canton, Ohio, assignor to The Goodyear Tire & Rubber Company, Akron, Ohio, a corporation of Ohio
Filed Sept. 8, 1959, Ser. No. 838,609
2 Claims. (Cl. 340—407)

This invention relates to indicator, or warning means as may be used with wheel slip or skid warning systems, and especially to indicator means by which the actuator of a braking mechanism can be mechanically advised of the fact that undesired conditions exist in the braked member.

The present invention particularly relates to apparatus for indicating or warning a pilot or driver of the existence of, for example, skidding, or undesirable slipping conditions in a wheel of a vehicle, such as an aircraft, and it will be so described hereinafter. However, it will be realized that the principles of the invention could be used on any desired type of a vehicle for any desired warning action.

When landing an aircraft, it is highly desirable to prevent over-braking actions with consequent undesirable tire slipping or skidding and less braking efficiency. Hence, there have been efforts made heretofore to provide certain controls for a braking action in airplane wheels wherein braking action is automatically limited or is periodically relieved by the controls provided. One of such systems is disclosed in my prior joint patent application Serial No. 451,812 and other systems of this type have been disclosed in patents, such as Patent No. 2,744,699. However, such automatic apparatus is somewhat complex and is rather costly so that much interest exists in merely warning a pilot, for example, that excessive braking forces are being applied.

The general object of the present invention is to provide a relatively uncomplicated and inexpensive slip or skid indicator apparatus for use in vehicles whereby the actuator of a braking means is physically advised of the fact that undesirable conditions exist on a braked wheel.

Another object of the invention is to warn a person immediately by means physically contacting the person's foot when a braked wheel that he controls is functioning improperly.

A further object of the invention is to provide warning or indicator apparatus that physically indicates to a person applying a braking force that undesirable action is resulting and to have the person instinctively reduce the braking action with a minimum of psychological action after such indication has been received.

Another object of the invention is to provide a skid warning system that is relatively easy to install on existing aircraft structures; and to provide a skid warning means which aids a pilot in his physical control of braking action for maximum efficiency thereof.

Still another object of the invention is to provide a skid warning apparatus that doesn't require any extensive certification or approval by Safety Boards controlling or regulating airplanes and activity thereof.

Yet another object of the invention is to provide a braked wheel skid warning apparatus adapted for use with a plurality of braking pedals wherein the braking pedals control different support wheels of the vehicle.

A further object of the invention is to position a mechanical agitator member directly on a brake pedal and to connect such agitator member to sensing means whereby when an undesired action, such as slip or skid conditions exist in a braked wheel, the mechanical agitator will physically vibrate to shake or contact the foot of the person actuating the brake pedal to warn of undesired action in the braked wheel.

Another object of the invention is to provide an agitator member on a brake pedal and including an agitator pin or member extending through a hole in the brake pedal for direct vibratory contact with the foot of the person actuating the brake pedal, which agitator pin can be controlled either by an electric motor and connecting cam and spring means, by an electromagnetic vibratory device, or by an electrically controlled hydraulic or pneumatic means.

The foregoing and other objects and advantages of the invention will be made more apparent as the specification proceeds.

For a better understanding of the invention, attention now is directed to the accompanying drawings wherein.

When referring to corresponding parts shown in the drawings and referred to in the specification, corresponding numerals are used to facilitate comparison between equivalent parts on the drawings and referred to in the specification.

The present invention relates to indicator or warning means or apparatus, particularly adapted for use in combination with a brake pedal for indicating or warning the person actuating the brake of undesirable braking conditions and including the combination of an electric motor having an output shaft, means securing such electric motor to the brake pedal, a leaf spring fixedly secured adjacent one end to the brake pedal and having a cantilever end section terminating adjacent the brake pedal, cam means carried on the motor output shaft, cam follower means connecting the cam means and leaf spring together for moving the cantilever section of such spring away from the brake pedal and then releasing the spring on rotation of the output shaft, and a striker pin carried by the leaf spring and extending through a hole in the brake pedal for striking a person's foot on the brake pedal when the electric motor is actuated to drive the cam.

Figure 1:
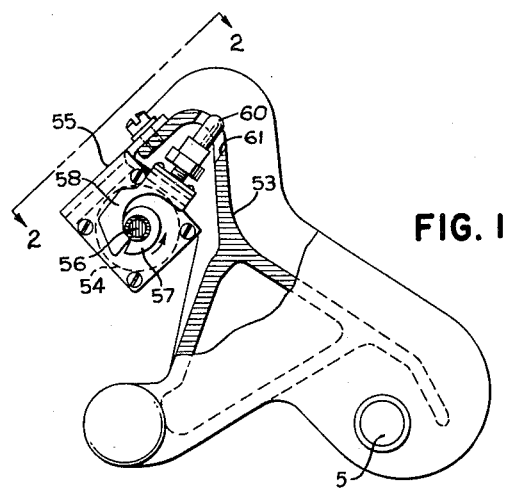
FIG. 1 is an elevation, partially broken away and shown in vertical section, of a warning member of the invention shown in association with a brake pedal.
Figure 2:
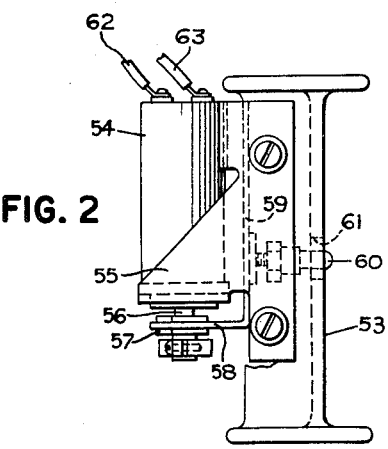
FIG. 2 is an elevational view taken on line 2—2 of FIG. 1.
Figure 3:
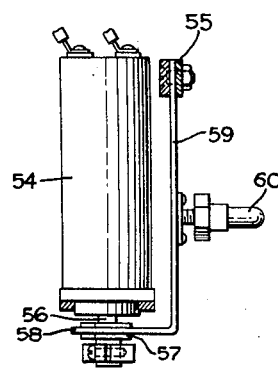
FIG. 3 is a view showing further details of the engagement of the positioning spring and motor driven control cam of FIGS. 1 and 2.

The physical skid warning member and associated means of the invention is shown in FIGS. 1, 2 and 3 of the drawings, and in this instance a brake pedal 53 is shown that has an electric motor 54 secured thereto as by means of a bracket 55. An output shaft 56 of the motor 54 has a cam 57 secured thereto. This cam 57 is adapted to engage a cam follower 58 secured to or comprising the end portion of a cantilever section of a leaf spring 59. One end of the leaf spring 59 is fixedly secured to the bracket 55, or to the brake pedal 53, adjacent the opposite end of the motor 54 from the cam 57. The spring 59 has a striker pin 60 suitably secured thereto spaced from the fixed end of the spring. Such pin 60 extends through a hole 61 provided in the brake pedal 53 and the pin is adapted to be oscillated back and forth rapidly substantially along its own axis when the motor 54 is energized. Such movement will cause the pin 60 to strike the foot of the person using the brake pedal 53 for braking action. The cam 57 has an eccentric camming surface extending around about ¾ of its circumference and terminating in a shoulder or step for release of the spring 59. The cam follower 58 and cam 57 gradually force the spring 59 away from the brake pedal 53 so that a snap action is secured as the spring 59 is released by the cam and impacts or thumps are produced by the pin 60 striking a pilot's foot when the motor 54 is energized to warn of skid conditions in the braked wheel or wheels controlled by the brake pedal 53.

Leads 62 and 63 connect the motor 54 to a suitable power source (not shown). Such source will usually be a sensing system to indicate by supply of power to such leads that skid conditions are being approached on a braked wheel to provide a positive indication of such fact to the pilot or driver applying the braking forces.

The sensing means used in the control of the invention may be of any suitable known construction, such as disclosed in the patent previously mentioned. Such sensing means must indicate, usually by an electrical pulse, that excessive braking forces have been applied to the braked wheel and that skid conditions are approaching. This indication from the braked wheel is then used to actuate the physical warning means of the invention on the brake pedal.

When it is desired to indicate the presence of skidding conditions or the approach of such conditions in a plurality of wheel units, such as on an airplane wherein two braked wheels each on a separate support and two brake pedals are provided, then a separate sensing physical warning means or unit of the invention would be associated with each brake pedal. When more than one wheel is carried on one support strut for the airplane, usually only one sensing means and one brake pedal is utilized for the plurality of wheels.

The brake pedal 53 is pivotally positioned on a support 5, and connects by conventional means (not shown) to the controlled brake means.

This is a continuation-in-part of my prior application Serial No. 643,825, now Patent 2,930,026.

From the foregoing it is seen that a novel and useful type of skid warning means have been provided by the invention and that the objects thereof have been achieved.

While a certain representative embodiment and details have been shown for the purposes of illustrating the invention, it will be apparent to those skilled in this art that various changes and modifications may be made therein without departing from the spirit or scope of the invention.

What is claimed is:

1. In combination with a pivotally mounted brake pedal, an electric motor having a rotatable output shaft, means securing said electric motor to the brake pedal spaced from the top surface thereof, a leaf spring fixedly secured adjacent one end to said brake pedal and having a cantilever section terminating adjacent the brake pedal, cam means rotatably mounted on said electric motor output shaft, cam follower means connecting said cam means and leaf spring for moving a portion of such spring away from the brake pedal and then releasing such spring on each rotation of said output shaft, and a striker pin carried by said leaf spring and extending therefrom through the brake pedal for directly striking a person's foot on the brake pedal when said electrical motor is actuated to pull said leaf spring away from the brake pedal and said leaf spring is released.

2. In combination with a pivotally mounted brake pedal, a motor having a rotatable output shaft, means securing said motor to the brake pedal, a leaf spring secured adjacent one end to said brake pedal and having a cantilever end adjacent the brake pedal, cam means on said motor output shaft, cam follower means connecting said cam means and leaf spring for moving a portion of such spring away from the brake pedal and then releasing such spring on each rotation of said output shaft for rapid striking movement towards the brake pedal, and a striker pin carried by said leaf spring and extending through a hole in said brake pedal for directly striking a person's foot on the brake pedal when said electrical motor is actuated to drive said cam.

References Cited in the file of this patent

UNITED STATES PATENTS

| 2,128,250 | Howard | Aug. 30, 1938 |
| 2,185,329 | Caldwell | Jan. 2, 1940 |
| 2,284,040 | Caldwell | May 26, 1942 |
| 2,337,482 | Lyska | Dec. 21, 1943 |
| 2,624,793 | Pearson | Jan. 6, 1953 |